No. 718,199. PATENTED JAN. 13, 1903.
A. B. FOWLER.
SHOE SEWING MACHINE.
APPLICATION FILED APR. 18, 1896.
NO MODEL. 7 SHEETS—SHEET 2.

Witnesses
Charles W. Jones
Victor Sandahl

Inventor
Alfred B. Fowler
by Henry Chadbourn
his Atty.

No. 718,199. PATENTED JAN. 13, 1903.
A. B. FOWLER.
SHOE SEWING MACHINE.
APPLICATION FILED APR. 18, 1896.
NO MODEL. 7 SHEETS—SHEET 6.

Witnesses
Charles W Jones
Victor Sandahl

Inventor
Alfred B. Fowler
by Henry Chadbourn
his Atty.

THE NORRIS PETERS CO., PHOTO-LITHO., WASHINGTON, D. C.

No. 718,199. PATENTED JAN. 13, 1903.
A. B. FOWLER.
SHOE SEWING MACHINE.
APPLICATION FILED APR. 18, 1896.
NO MODEL. 7 SHEETS—SHEET 7.

Witnesses
Charles W Jones
Victor Sandahl

Inventor
Alfred B. Fowler
by Henry Chadbourn
his Atty.

ALFRED B. FOWLER, OF CENTRAL FALLS, RHODE ISLAND.

SHOE-SEWING MACHINE.

SPECIFICATION forming part of Letters Patent No. 718,199, dated January 13, 1903.

Application filed April 18, 1896. Serial No. 588,086. (No model.)

*To all whom it may concern:*

Be it known that I, ALFRED B. FOWLER, of Central Falls, in the county of Providence and State of Rhode Island, have invented certain new and useful Improvements in Sewing-Machines, of which the following, taken in connection with the accompanying drawings, is a specification.

The present invention relates to an improvement in shoe-sewing machines, and more particularly to shoe-sewing machines of the wax-thread chain-stitch type.

One of the objects of my invention is to reorganize and improve the construction and operation of sewing-machines of this class by providing a tension-wheel and mechanism for intermittently and positively actuating it to pay off thread to the needle during its retracting stroke, operating to discontinue such paying-off action during the latter portion of the retracting stroke of the needle, said tension device having frictional means operating on the tension-wheel to control its rotation under the strain of the thread exerted thereon by the needle during the latter portion of the retracting stroke thereof, thus dispensing with a pull-off and its operating mechanism and relieving the needle of the duty of pulling off thread.

Another object of my invention is to reorganize the arrangement and operation of the channel-guide, needle, and feed point, so as to reduce the space within which they work, and thereby to facilitate sewing around sharp curves, as around the toes of pointed-toe shoes. To this end I have caused the channel-guide to reciprocate across the plane of movement of the needle and have arranged the feed-point on the advance side of the channel-guide—that is, on the side opposite the needle before feed takes place.

Heretofore, so far as I am aware, it has been generally the practice in chain-stitch shoe-sewing machines to hold the needle stationary in its retracted position, holding in its hook during the feed of the work the loop of thread which it has just drawn through the material. Such mode of operation, however, is objectionable, because by reason of the feed of the material the distance from the needle to the needle-hole from which the loop extends is increased by the angular lead of the thread after such feeding movement, and as a consequence the feed of the material is liable to cause an undue strain to be exerted upon the said loop, which has to be borne by the needle-thread and material and is liable to injure the needle or break the thread or cut or strain the between substance of the sole, or upon the disengagement of the feed-point with the material to pull the material backward slightly, thus causing irregularity in the length of the stitches of the seam being sewed.

Another object of my invention is to improve the construction and operation of sewing-machines of this class so as to avoid bringing an undue strain on the loop of thread held in the hook of the needle during the feed of the material by causing the needle to move forward slightly during the feeding of the work.

To the above ends the present invention consists in the devices and combinations of devices hereinafter described and claimed.

In the accompanying drawings, illustrating the preferred form of my invention, Fig. 8 represents a longitudinal section of the shaft on which the tension-wheel is mounted on the line C D in Fig. 7.

The head of the machine is mounted upon a suitable standard 1, said head being provided with a suitable frame 2 for the support of the various devices constituting the head. Within bearings in the frame 2 is journaled the driving-shaft 3, upon which are firmly mounted the driving-pulley or balance-wheel 4 and the cams 5 and 6, which shaft is rotated in the direction of the arrows shown on the drawings by means of a suitable belt on the pulley 4, as is usual with machines of this class.

The curved-hook needle 9, provided with the usual needle-guide 10, is attached in the usual manner to the needle-block 8, which is pivoted upon the bracket 7, firmly attached to the frame 2 of the machine, said bracket being provided with guides for the needle-block. A lever 11 is fulcrumed to the frame 2 and is connected at its lower end to the needle-block by means of the connecting-rod 12. The lever 11 is provided with a pin and roll 13, which is guided in cam-groove 14 (shown in dotted lines in Fig. 3) in the cam 5, which cam-groove causes the needle-block and attached needle to intermittently oscillate and the needle to pierce and withdraw from the stock.

The oscillating looper 15 is mounted in such a position within a bearing in the forward part of the bracket 7 that its lower end will oscillate around the projecting point of the needle when the needle is forced through the stock and by so doing will loop the thread into the hook of the needle. A lever 16 is fulcrumed at its lower end to the frame 2 and at its upper end is connected by means of the connecting-rod 17 to a sliding toothed rack 18, which slides forward and backward within guides in the bracket 7 and meshes into a toothed pinion 19 on the upper end of the looper. The lever 16 is provided with a pin and roll 20, which is guided within a cam-groove 21 (shown by dotted lines in Fig. 2) in the cam 6, which cam-groove causes an intermitting reciprocation of the rack 18 and oscillation of the looper.

Figure 3:
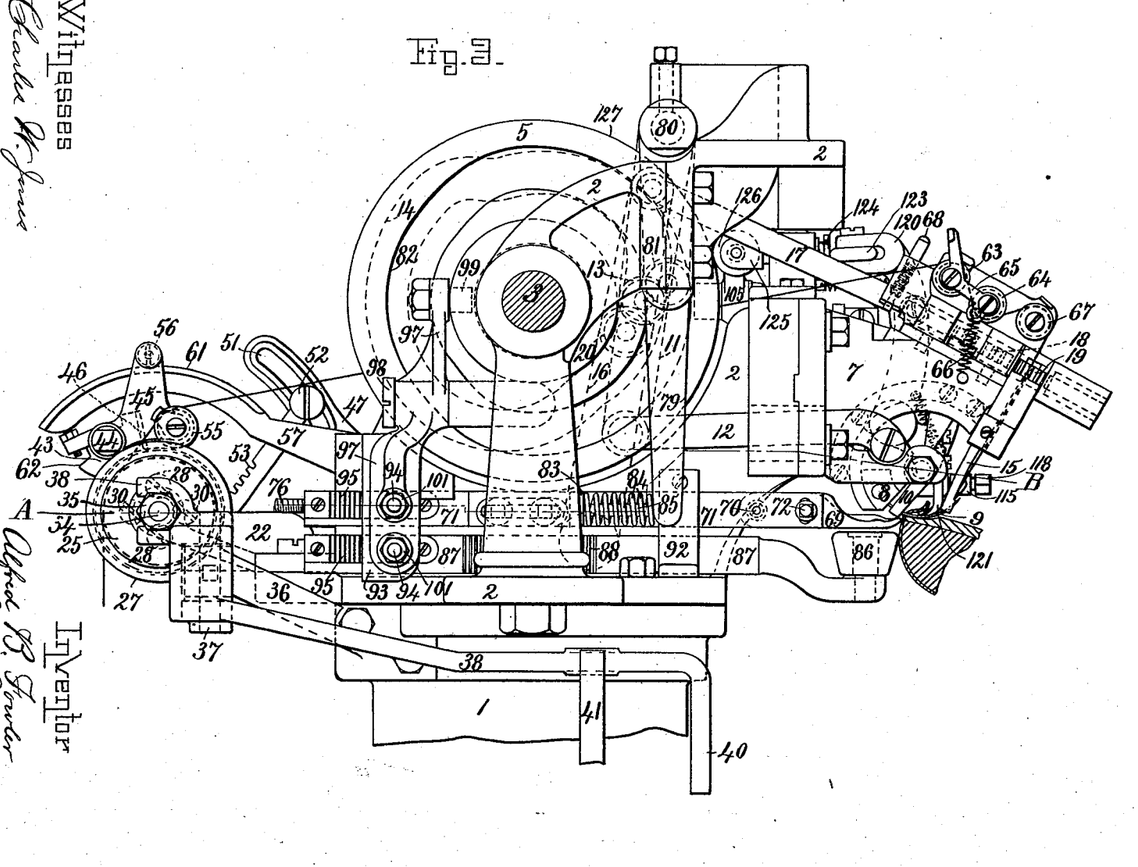
Fig. 3 represents a side elevation of the opposite side of the head of the machine from that shown in Fig. 2, showing the driving-shaft in section and the driving-pulley removed.

The tension-shaft 23 is mounted within bearings in a bracket 22, attached to the back of the frame 2, and has a longitudinal movement in said bearings, but is prevented from rotating therein by means of the key and keyway 24. Upon one end of the shaft 23 is screwed or otherwise firmly attached the flange 25, and upon the shaft between said flange and a second flange 26, attached to or made in one piece with the bracket 22, are loosely mounted the tension-wheel, (preferably made in two parts 27 27 and held together by means of the screws 28 28,) the ratchet-wheel 29, (attached to the tension-wheel by means of the screws 30 30 or made integral therewith,) and the friction-producing washers 31 31, (made of felt or other suitable material,) and introduced respectively between the tension-wheel and its adjacent flange and between the ratchet-wheel and its adjacent flange. The opposite end of the shaft 23 is screw-threaded and provided with the thumb-nut 32, and upon said shaft between said nut and the bracket 22 is placed the spring 33, which tends to move said shaft longitudinally within its bearings and produces tension of the thread carried over the tension-wheel. It will be seen that the amount of tension on the thread exerted by this frictional means can be adjusted by the adjustment of the nut 32 upon the shaft 23, as is common with tension devices now in use. Means are provided to release the frictional means when it is desired to take off the tension to enter or remove a shoe. The illustrated embodiment of such means is described as follows: The shaft 23 is provided with an extension 34, which is screwed into the screw-threaded hub of the flange 25 or otherwise firmly attached thereto. This extension is screw-threaded on its outer end and provided with a nut and check-nut 35, adjustable thereon. A bracket 36 is attached to the upper end of the standard 1 or to some other stationary part of the machine, and to the outer end of this bracket is fulcrumed at 37 the lever 38, which is forked at one end and embraces the extension 34. A washer 39 is placed upon the extension 34 between the forked end of the lever 38 and the nut and check-nut 35. It will be seen that the lever 38 may be turned upon its fulcrum in such a manner that its forked end will press against the washer 39, and thereby cause the shaft 23 to move longitudinally in its bearings, releasing the friction from the tension-wheel, and consequently the tension from the thread. This tension-releasing lever may be operated either by hand or automatically by the treadle which starts and stops the machine or by an independent treadle. In order to operate said lever by hand, I provide its forward end with a suitable handle 40, as shown in Fig. 3. If the tension-release lever is to be operated by means of a treadle, I provide the standard of the machine with an intermediate lever 41. The upper end only of this intermediate lever has been shown on the drawings in Fig. 3, as the particular connection between the lever and the treadle or manner of operating said lever forms no part of this invention and may be accomplished in any well-known manner. The upper end of the intermediate lever rests against the side of the tension-release lever and operates the release-lever to release the tension on the thread by pressing the release-lever toward the standard of the machine.

Figures 13, 15, 16:
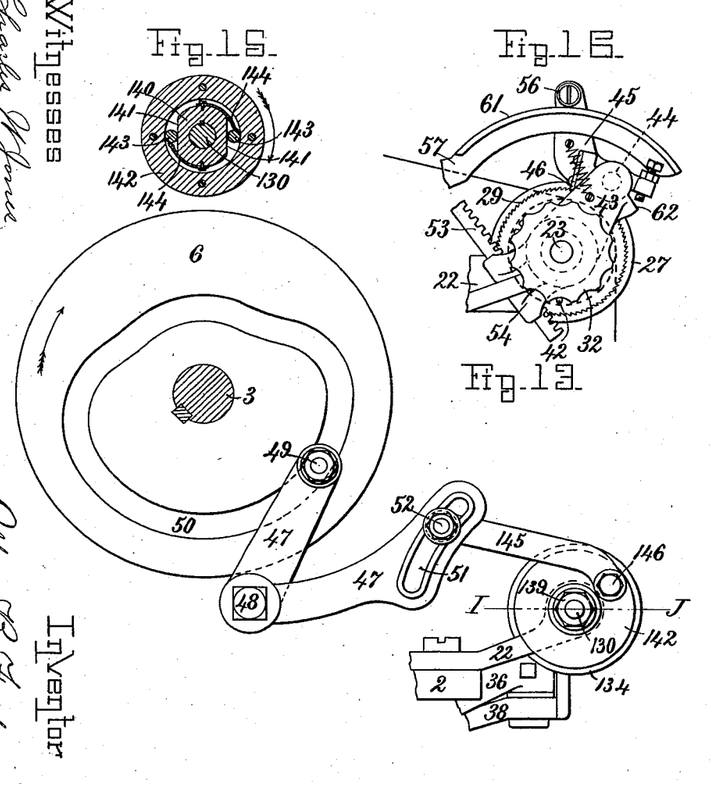
Fig. 13 represents a detail view of a modified form of the mechanism employed to cause the mechanical feeding of the thread from the tension device for the formation of the stitch.
Fig. 15 represents a cross-section on the line K L shown in Fig. 14.
Fig. 16 represents a side elevation of the tension-shaft, showing a slight variation in the device used to mechanically operate the tension-wheel to deliver thread to the needle for the formation of the stitch.

The preferred means for positively rotating the tension-wheel to pay off thread, which are intermittently connected therewith and disconnected therefrom, and the mode of operation of such means are described as follows: Upon the shaft 23 is loosely mounted the sector-gear 42, which is provided with the arm 43, and to said arm at 44 is pivoted the pawl 45 in such a position that its attached tooth 46 is normally held in engagement with a tooth of the ratchet-wheel 29, or said tooth may, if so desired, be held in contact with the ratchet-wheel by means of a yielding spring-pressure, as shown in Fig. 16. A bellcrank lever 47 is fulcrumed at 48 to the frame 2 and is provided at one end with the pin and roll 49, guided within a cam-groove 50 in the cam 6. The opposite end of the lever 47 is provided with a slot 51, within which the fulcrum 52 for the rack 53 is adjustably but firmly held. A guide 54 for the rack 53 is loosely mounted upon the hub of the sector-gear 42 or upon the shaft 23 and tends to keep the teeth of the rack 53 in mesh with the teeth of the sector-gear 42. The cam-groove 50 is of such a shape that it causes the lever 47 to intermittently oscillate upon its fulcrum, which in turn causes the intermittent reciprocation of the rack 53 and consequent oscillation of the pawl 45. This oscillation of the pawl causes a positive intermittent rotation of the tension-wheel 27 and a consequent paying off of thread from said tension-wheel. The amount of rotation imparted to the tension-wheel by the action of the cam-groove 50 and intermediate mechanism is such that the thread delivered thereby at each movement of the wheel is a little less than the amount of thread necessary to form a single stitch, and such amount is adjusted by means of the adjustment of the fulcrum 52 within the slot 51 in the lever 47, as will be understood. The action of the cam-groove 50 is so timed with relation to the movements of the needle that the thread paid off thereby will be delivered in sufficient quantities as the looper loops the thread into the hook of the needle and as the needle draws the loop through the stock and before it has completed such operation, so that before the retracting stroke of the needle is completed the tension-wheel ceases to be rotated by the pawl and its actuating mechanism and so that during the completion of the retracting stroke of the needle the tension-wheel is controlled by the frictional means, which permit its rotation when sufficient strain is brought upon the thread by the needle. In the machine of the drawings this final pull of the needle exerts a stitch-setting strain on the thread, which is resisted by the friction on the tension-wheel.

It is to be observed that when the forward motion of the pawl 45 ceases the tension-wheel is controlled by the frictional means alone which permit its rotation when sufficient strain is brought upon the thread and that at the time of the cessation of the forward motion of the pawl and thereafter during its backward motion the pawl is for all practical purposes disconnected from the tension-wheel, being merely pressed thereagainst by its weight or by the light spring (shown in Fig. 16) and offering no resistance to forward rotation of the tension-wheel. My invention contemplates a positive rotation of the tension-wheel to pay off thread to the needle during the earlier portion of its retracting stroke, interrupted in its action prior to the completion of such retracting stroke, and frictionally-resisted rotation of the tension-wheel under strain of the thread exerted thereon by the needle during the latter portion of the retracting stroke of the needle, and any mechanism constructed, organized, and operating in this manner is within the scope of my invention. I have hereinafter described a modified form of this mechanism.

If desired, the pawl may be provided with a thread-truck 55, over which the thread is conveyed in such manner as to cause the tooth 46 of the pawl 45 to be pressed into engagement with the ratchet-wheel 29 when the thread is drawn tight, and such construction has the function of causing the truck 55 to act as a take-up when the pawl is moved backward by its cam and connections. I prefer to dispense with this thread-truck 55, however, as it acts to increase the frictional resistance to the rotation of the tension-wheel during the latter portion of the retracting stroke of the needle in the construction as thus far described.

Mechanism may be employed to positively disconnect the pawl 45 from the ratchet-wheel 29, and in such case the thread-truck 55 could be used if the take-up action was desired or dispensed with if such action was not desired. Such disconnecting mechanism in the illustrated embodiment of my invention is described as follows: The pawl 45 is provided with the pin and roll 56, and a lever 57 is fulcrumed at 58 to the frame 2, which lever is provided at one end with a pin and roll 59, guided within a cam-groove 60 in the cam 5, and at the other end said lever is provided with the circular surface 61, which engages the pin and roll 56 when said lever is turned upon its fulcrum by the action of said cam-groove. The engagement of the pin and roll 56 by the circular surface of the lever 57 causes the tooth of the pawl to disengage the teeth of the ratchet-wheel and holds such parts out of engagement, while the sector-gear causes the pawl to move backward into position to again rotate the tension-wheel, the pin and roll on the pawl moving during this time on the circular surface on the lever 57. To prevent the pawl 45 from being rotated too far on its fulcrum 44, and thus withdrawing the tooth of the pawl too far from the teeth of the ratchet-wheel either by centrifugal action caused by the rapid action of the machine or when the pawl is raised by the action of the lever 57, I provide the tail of the pawl with a set-screw which is adjustably mounted therein and which comes in contact with the projection 62 on the arm 43 of the sector-gear and limits the movements of said pawl, as will be readily understood.

The lead of the thread from the tension-wheel to the looper is over the truck 55 on the pawl 45, (provided, however, that such thread-truck is used,) over the thread-truck 63, mounted, preferably, upon the top of the bracket 7, and under the thread-truck 64, mounted upon the end of a lever 65, which lever is pivotally mounted upon the stud for the truck 63 and is acted upon by means of a suitable spring 66, attached to said lever and to some stationary part of the machine, said lever being pressed forward and acting to draw said thread from the course it would naturally take between the truck 63 and the thread-truck 67, over which it is carried from the truck 64, and finally through the hollow looper-shaft and perforation in the looper.

The action of the spring-actuated lever 65 upon the thread is to draw the thread out of a straight line in the course between the trucks 63 and 67, thereby controlling any slack thread between the tension-wheel and the needle, and also to hold the thread in such a position until the strain on the thread is sufficient to overcome the power of the spring 66, in which case the lever will yield against the action of the spring, and thereby cushion any sudden increase in the strain on the thread, which would otherwise tend to break the same. To add to the strength of the spring which cushions the lever 65, I provide the frame of the machine with a spring-pressed bumper 68, against which the end of the lever comes when sufficient strain is brought to bear upon the thread to overcome the strength of the spring 66. This spring-pressed bumper acts as a cushion to the lever 65, and by its action any strain on the thread which is sufficient to overcome the strength of the spring 66 is cushioned.

While any suitable back gage and auxiliary back-gage mechanism may be employed in connection with my invention, I have shown the form of such mechanism which I prefer to employ and which is described as follows: The back gage 69 is pivoted at 70 to the back-gage slide 71, and its forward end is adjusted up and down to its proper position relative to the stock and needle, the gage being held in its adjusted position by means of the set-screw 72, screwed into the back gage through a slot in the slide 71. The slide 71 is guided and movable forward and backward within guides in the frame 2 and is provided with a stud 73, which projects through a slot in the frame into a tubular recess 74, extending inward from the rear of the frame. The tubular recess 74 is screw-threaded in its outer end and provided with a perforated plug 75, screwed and adjustable therein. A rod is attached to the stud 73 and projects backward therefrom, being guided loosely within the perforation in the plug 75. A spring 77 surrounds the rod 76 between the stud 73 and the plug 75, the action of said spring being to force the back gage forward with a yielding pressure against the stock. The end of the rod 76 which projects beyond the plug is screw-threaded and provided with the nut 78, adjustable on said rod. It will thus be seen that the forward movement of the back gage caused by the spring 77 is limited and adjusted by means of this nut upon the rod 76. The lever 79 is fulcrumed at 80 to the frame 2 and is provided with the pin and roll 81, which is guided within a cam-groove 82 on the cam 5, as shown in Fig. 3. Upon the back-gage slide 71 is adjustably but firmly secured the bracket 83, and the spring 84 is preferably interposed between the lower end of the lever 79 and said bracket, which spring is held in place by means of the stud 85, secured to said bracket. The lower end of the lever 79 is forked to receive the stud 85, when said lever is operated to withdraw the back gage, as will be described hereinafter.

From the above description of the back gage and its connected mechanism it will be seen that by the action of the cam-groove 82 upon the lever 79 the lower end of said lever is caused to oscillate toward and from the bracket 83 and that when said lever is moved toward said bracket the spring 84 will be compressed until the pressure caused thereby exceeds the strength of the spring 77. This will cause the compression of the latter spring and the backward movement of the slide 71, with its attached back gage, thus causing the withdrawal of the back gage from contact with the stock being sewed. The interposition of the spring 84 between the back-gage-operating lever and the bracket on the back-gage slide forms a yielding cushion between said parts, and yet allows the back gage to be forced backward against the influence of the spring 77 by the stock independently of the operating-lever 79, thus forming a yielding back gage.

Figures 4, 5:
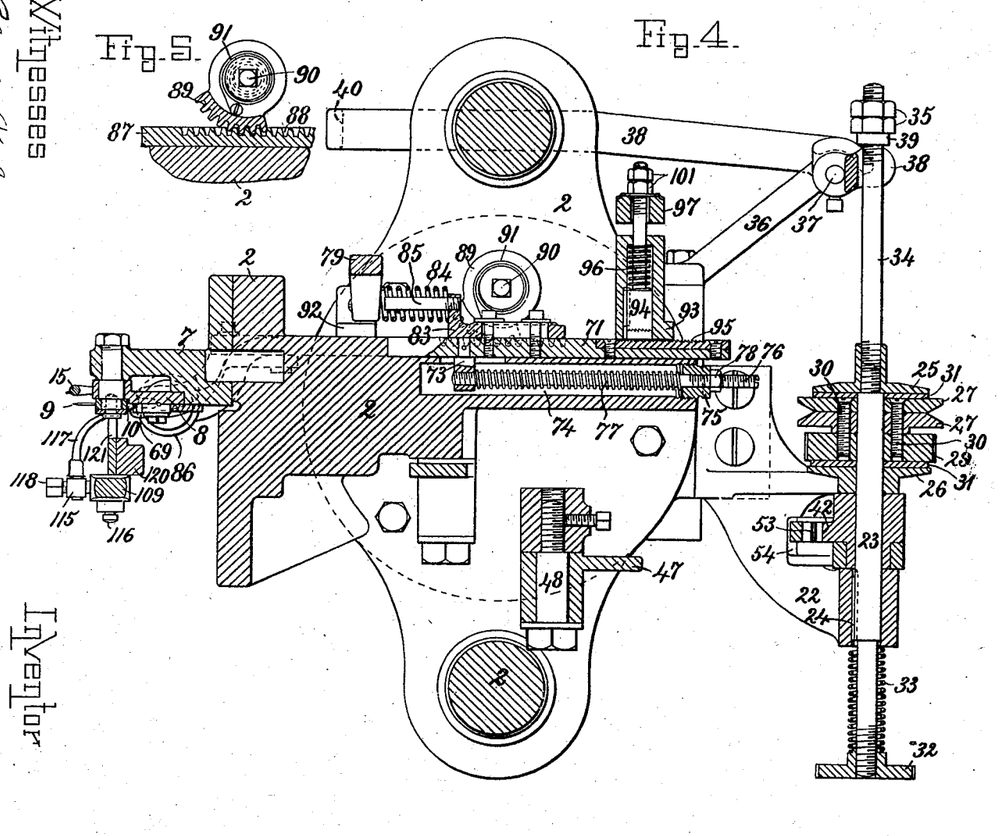
Fig. 4 represents a horizontal section on the line A B shown in Fig. 3.
Fig. 5 represents a detail sectional view of the means employed to cause the auxiliary back gage to be pressed forward with a yielding pressure.

The auxiliary back gage 86 is preferably made in the form of a roll pivotally mounted upon the outer end of the slide 87 and is guided and movably mounted within guides in the frame 2 in a similar manner to the back-gage slide. The slide 87 is provided with gear-teeth 88, which mesh into the teeth of a sector-gear 89, pivotally mounted upon the stud 90 on the bed of the frame 2. A clock-spring 91 is attached at one end to the sector-gear 89 and at the other end to the stud 90, the tendency of said spring being to force the auxiliary back gage forward with a yielding pressure and the character of the spring tending to make such pressure approximately the same for all positions of the auxiliary back gage. By the use of the clock-spring and the consequent slight variation in the strain upon the same the auxiliary back gage is more sensitive and the spring is less liable to crystallize and break. The back-gage slide 71 and the auxiliary-back-gage slide 87 are held within their respective guides in the frame 2 by means of the caps 92 and 93, substantially as shown in Figs. 3 and 4. Within bearings in the cap 93 are mounted and longitudinally movable the locking-bolts 94 94, one for each of the slides 71 and 87, which bolts are each provided with serrations or teeth adapted to engage the teeth of the racks 95 95, one of said racks being attached to each of the slides 71 and 87, as shown. The bolts 94 are normally held in engagement with racks 95 by means of the springs 96, surrounding said bolts within the bearings for the same. A lever 97 is fulcrumed at 98 to the frame 2 and is provided on its upper end with the pin and roll 99, which is guided within a cam-groove 100 on the hub of the cam 5. The lower end of said lever is provided with two perforations, through which the outer ends of locking-bolts 94 project and within which they are loosely movable. The ends of the bolts 94 are screw-threaded and are each provided with the nut and check-nut 101. Thus it will be seen that the action of the cam-groove upon the lever 97 will cause the lower end of said lever first to withdraw the locking-bolts 94 from engagement with their respective racks 95 and permit the springs acting on the back gage and auxiliary-back-gage slides to force said slides forward with a yielding pressure or said lever will be moved in the opposite direction and then by withdrawing from contact with the nuts 101 on said bolts will permit the springs 96 to force said bolts into engagement with the racks 95, and thereby lock the slides 71 and 87 firmly in the position they then occupy. The back gage and auxiliary back gage are locked by the spring-bolts 94 during the time that the needle is withdrawing from the stock with the loop of thread in its hook and are so locked to provide a rigid support for the stock during this operation of the needle.

The back gage, auxiliary back gage, and their actuating and locking mechanisms just described form no part of my invention and are illustrated and described herein merely for the sake of describing the complete machine in which my invention is preferably embodied.

I will now proceed to a description of that feature of my invention which relates to the rearrangement of the organization and operation of the channel-guide, needle, and feed-point, which consists, broadly stated, in giving the channel-guide a reciprocating motion across the plane of movements of the needle and in arranging the feed-point in advance of the channel-guide—that is to say, on the opposite side of the channel-guide from the needle before the feed takes place. Heretofore, so far as I am aware, it has never been proposed to have the channel-guide move across the plane of movements of the needle. As a result of this mode of operation the channel-guide moves only from one side of the needle to the other, in all a distance equal to the length of one stitch, with the consequent apparent advantages in sewing around curves of short radius.

Figure 1:
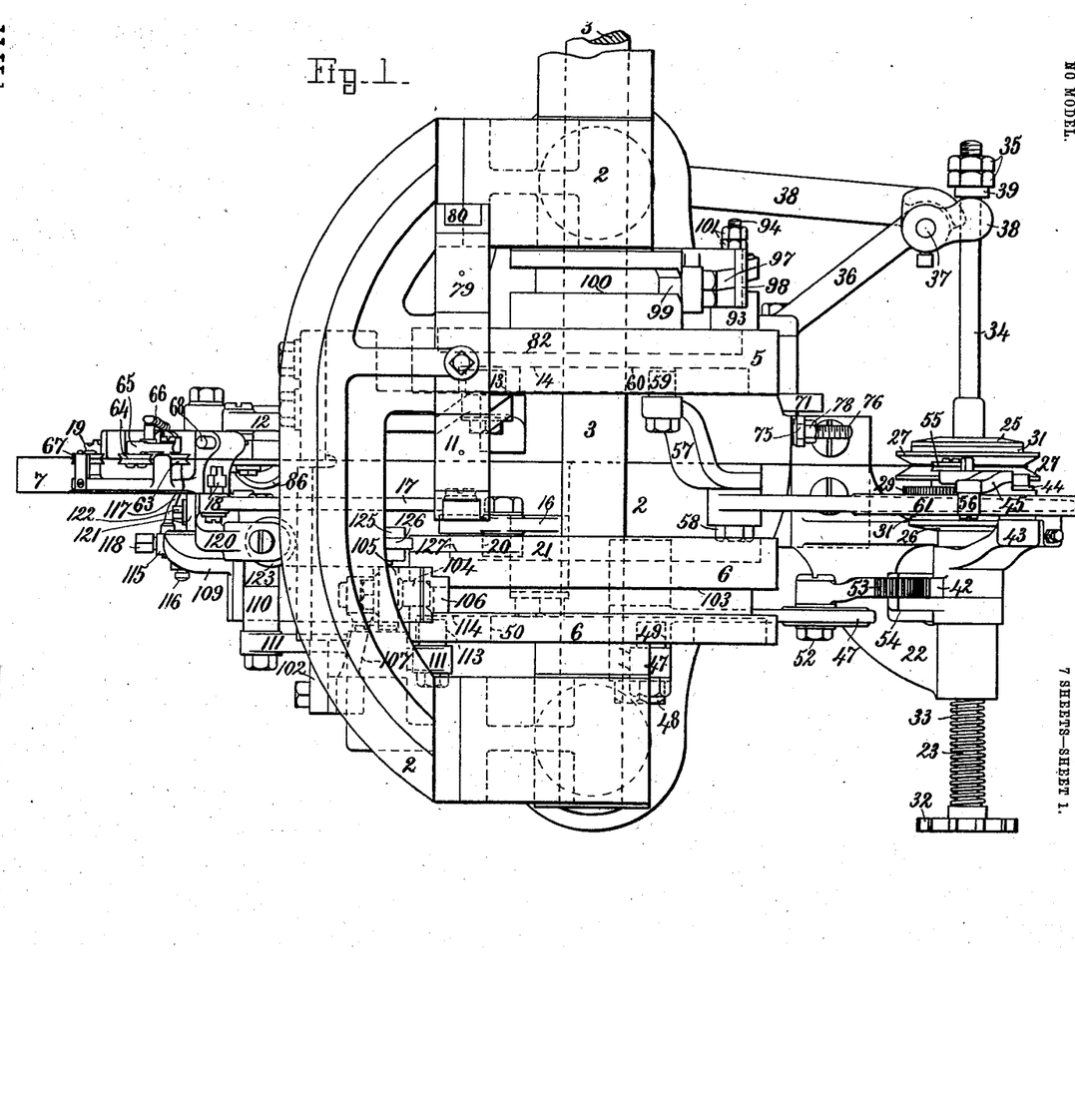
Figure 1 represents a plan view of the head of the sewing-machine.
Figures 2, 6:
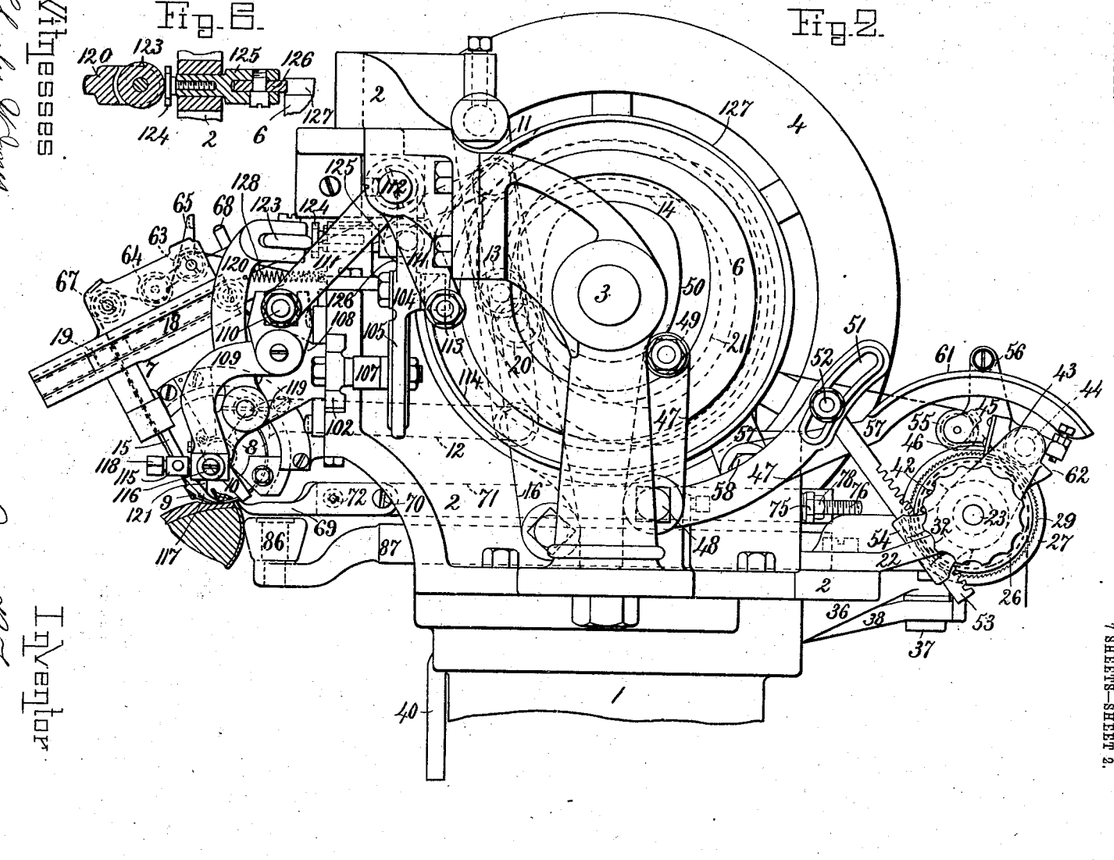
Fig. 2 represents a side elevation of the same as seen from the right side of the machine showing a small portion of the upper end of the standard to which the head is attached.
Fig. 6 represents a detail sectional view of the means employed to adjust the position of the channel-guide in and out of the channel in the stock being sewed.

Within guides on the front of the frame 2 is mounted the laterally-movable slide 102, which is reciprocated laterally within its guides by the action of the cam-groove 103 in the cam 6 upon the pin or roll 104 on the lever 105, fulcrumed at 106 to the frame 2, which lever is connected to the slide by means of the connecting rod or link 107, said connecting-rod being adjustably connected to the lever 105 within a slot in said lever, so that the amount of reciprocation imparted to the slide 102 can be varied. To an ear 108 on the slide 102 is pivotally mounted the feed-point-operating lever 109, which is forked and receives the pin block or roll 110 on one arm of the bell-crank lever 111, fulcrumed at 112 to the frame 2, the other arm of the lever 111 being provided with the pin and roll 113, guided within a cam-groove 114 in the cam 6. The action of the cam-groove 114 upon the pin and roll 113 is such that it causes the lower end of the lever 109 through its connected mechanism, as described, to move forward and backward. Within a perforation in the lower end of the lever 109 is mounted the stud 115, which may be rotated or moved longitudinally within said perforation and which is firmly held after being properly adjusted, as hereinafter set forth, by means of the set-screw 116. Within a perforation in the head of the stud 115 is mounted the feed-point 117 in such a manner that it can be rotated or moved longitudinally within said perforation and which is firmly held after being properly adjusted, as hereinafter set forth, by means of the set-screw 118. By this construction of the connection between the feed-point and the feed-point lever 109 I am enabled to adjust the position of the lower end of the feed-point longitudinally toward or from the plane of the movements of the needle and backward or forward in or out of the channel in the stock. The combined actions of the cam-grooves 103 and 114 upon the feed-point are such that the feed-point will have four motions, and thereby cause the intermittent feeding of the stock between each stitch formed, and the adjustment of the amount of reciprocation given to the slide 102 will vary the length of the feed or the stitch. To the second ear 119 on the slide 102 is pivotally mounted the lever 120, and to the lower end of said lever the channel-guide 121 is attached, by means of the screws 122 122, in such a manner that it is adjustable up and down upon said lever in order to bring the channel into which said guide projects in proper position, so that the needle will enter said channel after it has pierced the stock, and therefore lay the stitch properly within the channel. The upper end of the lever 120 is provided with the roll 123, which is held in contact with the head of the flat-headed screw or bolt 124, screwed into the end of and forming an extension to the stud 125, which is mounted and longitudinally movable within a bearing in the frame 2 or a bracket attached to said frame, as shown in Fig. 6. The stud 125 is provided with a roll 126, which travels upon the cam-surface 127 on the cam 6. The spring 128, attached to the lever 120 and to the frame 2, tends to hold said lever against the bolt 124 and the stud 125 against the cam-surface 127. The head of the bolt 124 is of sufficient size to allow the roll 123 to move thereon when the lever 120 is moved laterally with the slide 102, to which it is attached and with which it is moved when the stock is fed.

The action of the cam-surface 127 and the spring 128 upon the lever 120 is such as to cause said lever to be rocked slightly upon its fulcrum and the lower end of the attached channel-guide to be moved into and out of the channel in the stock. These movements of the channel-guide in connection with the lateral movements imparted to said guide by the movements of the slide 102 cause the channel-guide to have four movements similar to those given to the feed-point and of which the longitudinal movements are substantially in unison with the longitudinal movements of the feed-point.

Figures 7, 9:
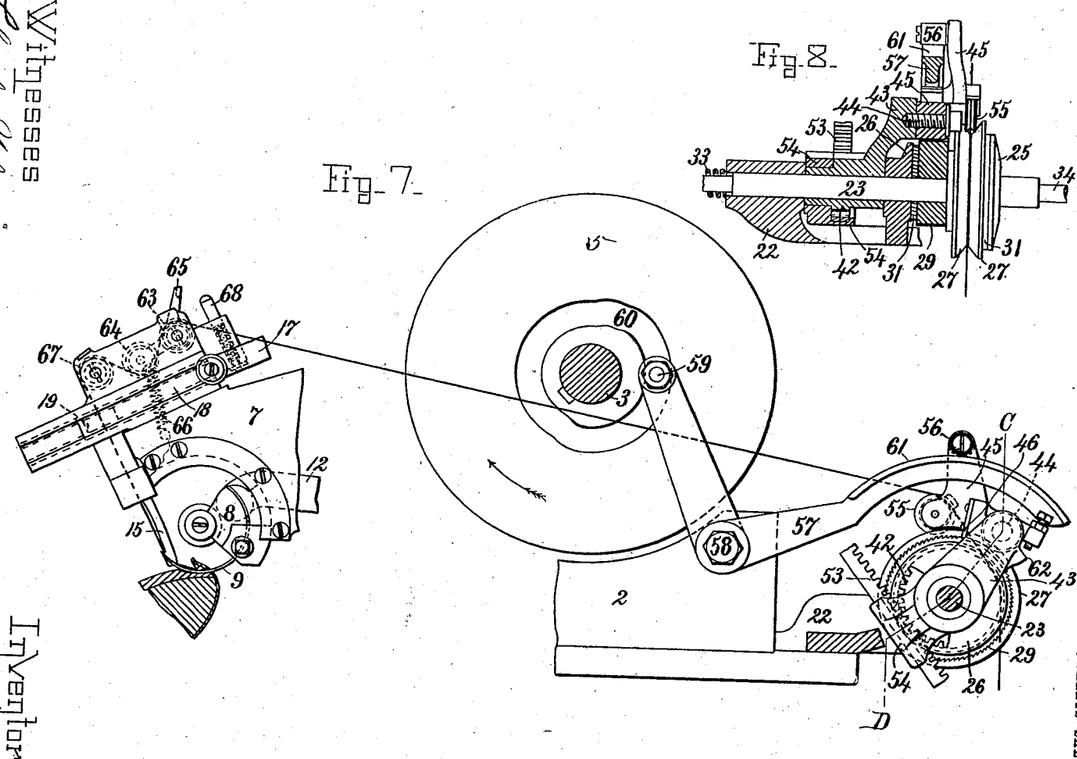
Fig. 7 represents a detail view showing the course of the thread through the tension device and from the tension device to the stock, also the mechanism employed to cause the mechanical feeding of the thread from the tension device for the formation of the stitch.
Fig. 9 represents a detail view of the needle, the looper, the feed-point, the channel-guide, and adjacent parts of the head of the machine, showing such parts in positions occupied when the needle has penetrated the stock, the looper has looped the thread upon the needle, and the feed-point and channel-guide are in position to feed the stock as soon as the needle has drawn the loop through the stock.
Figures 9, 10, 11, 12:
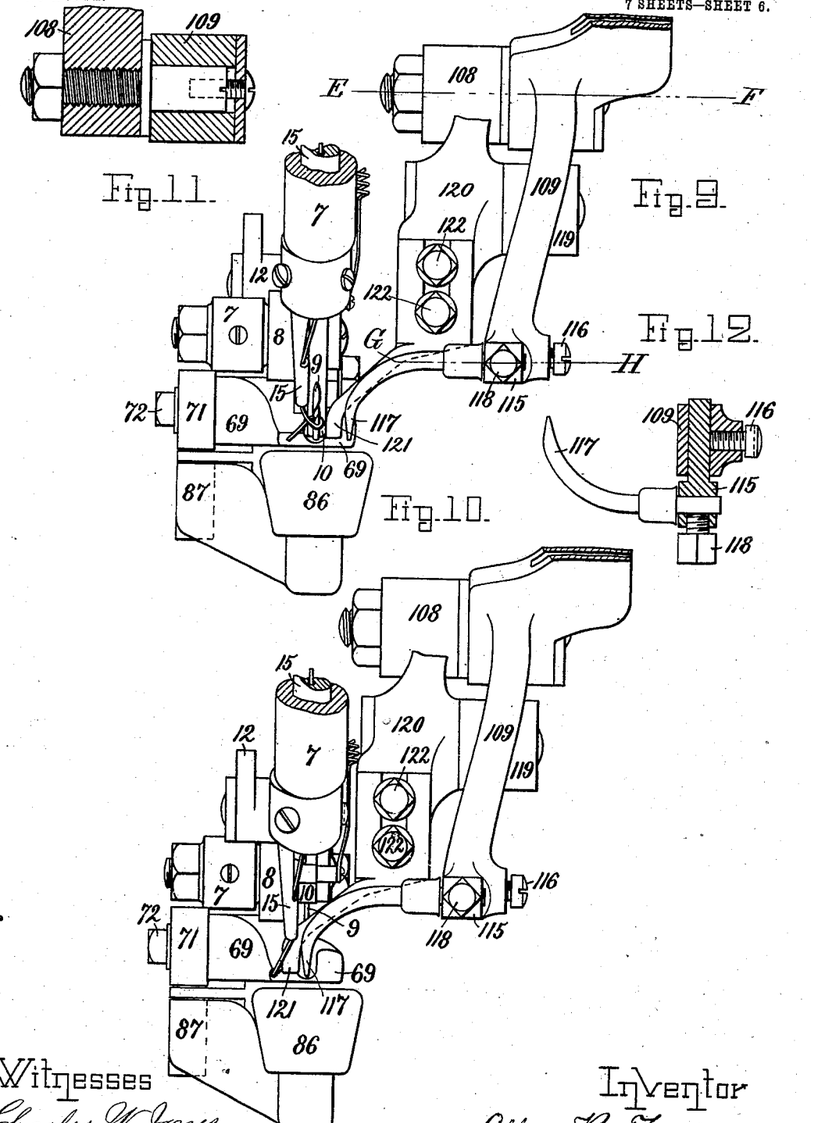
Fig. 10 represents a detail view of the same parts as shown in Fig. 9, but showing such parts in positions occupied by them after the needle has drawn the loop through the stock and the stock has been fed by the feed-point.
Fig. 11 represents a section on the line E F shown in Fig. 9.
Fig. 12 represents a section on the line G H shown in Fig. 9.

By reference to Figs. 9 and 10 of the drawings it will be seen that the feed-point is located in advance of the channel-guide—that is to say, on the side of the channel-guide opposite the needle before the feed takes place. It will also be seen that the feed-point moves from a position at the right of the needle to a position in front of or into the plane of movements of the needle when the work is fed. It will further be seen that the channel-guide is so located with relation to the feed-point that it must move longitudinally a distance substantially equal to and in unison with the feed-point and across or through the plane of movements of the needle. As above suggested, this arrangement of the channel-guide and feed-point materially reduces the space between the channel-guide, needle, and feed-point, so that the work may be easily fed around a curve of small radius—as, for instance, around the toe of a boot or shoe. By feeding the stock with the feed-point such as hereinbefore described, which moves from a position on one side into the plane of movements of and in line with the needle, it is to be observed that the needle will enter the indentations made in the stock by the feed-point, that said feed-point performs in a measure the functions of an awl and lessens the strain on the needle and its operating mechanism when forcing the needle through the materials, and that the construction conduces to an easy turning of the work with relation to the stitch-forming intrumentalities in sewing around curves.

Figure 14:
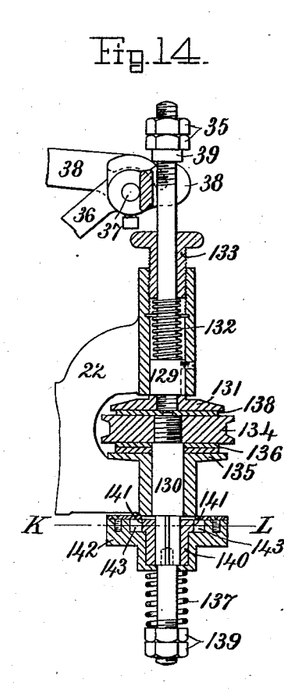
Fig. 14 represents a section on the line I J shown in Fig. 13.

The modified form, hereinbefore referred to, of the means for positively rotating the tension-wheel intermittently connected therewith and disconnected therefrom and its mode of operation is illustrated in Figs. 13, 14, and 15 and described as follows: The tension-shaft, which has its bearing in the bracket 22, is made in two sections 129 and 130, the section 129 being splined within its bearing in the bracket and allowed a longitudinal movement only. A flange 131 is firmly mounted on one end of the section 129, and a spring 132 surrounds said section between a shoulder thereon and a screw-threaded sleeve 133, screwed into the screw-threaded portion of the bearing for said section, the tendency of said spring being to move said section of the tension-shaft longitudinally in its bearings. The section 130 of the tension-shaft is free to rotate or to move longitudinally in its bearing in the bracket 22, and upon one end of said section is firmly mounted the tension-wheel 134. Upon the section 130 between the tension-wheel and a flange 135, attached to or made in one piece with the bracket 22, is mounted one or more felt or other friction-producing washers 136. A spring 137, surrounding the section 130, tends to move said section longitudinally in its bearing, and thereby produce friction between the tension-wheel and the flange 135 or the washers introduced between said parts. Between the flange 131 and the tension-wheel 134 is introduced the felt or other friction-producing washer or washers 138, and it will be seen that the combined actions of the springs 132 and 137 produce tension on the tension-wheel 134, which tension is adjusted as desired by means of the sleeve 133 and the nut and check-nut 139, as will be readily understood. Upon the section 130 of the tension-shaft is firmly mounted the sleeve 140, which is provided with a flange having the flattened sides 141 141, as shown in Fig. 15.

Upon said section and said sleeve is loosely mounted a second sleeve 142, having a circular recess to receive the flange on the sleeve 140. The circular wall of the recess in the sleeve 142, in combination with the flattened sides of the flange on the sleeve 140, forms tapering chambers within which are placed the rolls 143, said rolls being of such size that they rest against the wall of the circular recess and against the flattened sides of the sleeve 140. Springs 144 tend to prevent said rolls from moving into one of the tapering ends of the chambers formed in the recess. It will be seen that the two sleeves, the rolls, and the springs form a clutch which will allow the sleeve 142 to be rotated freely in the direction opposite to that indicated by the arrow in Fig. 15; but when the sleeve 142 is rotated in the direction indicated by the arrow in said figure the rolls will move into the other tapering part of the chambers formed within the recess, and thereby lock the two sleeves firmly together. Any further rotation of the sleeve 142 will cause a rotation of the section 130 of the tension-shaft, and consequently a rotation of the tension-wheel attached to said section. In this construction of the tension-operating mechanism the connecting-rod 145 is adjustably but pivotally attached to the lever 47 within the slot therein, the opposite end of said connecting-rod being pivotally attached to the sleeve 142 at 146, as shown. It will be seen that the action of the cam-groove 50 upon the lever 47 will cause the intermittent oscillation of the sleeve 142 and by means of the clutching device will cause the intermittent and positive operation of the tension-wheel in a manner similar to the mechanism hereinbefore described. This alternate construction of the tension-wheel and its operating mechanism forms another and a different embodiment of the same from that described; but it also embodies my invention and is within the purview of the claims.

With the various parts of the machine in the positions shown in the drawings the operation of the machine is as follows: The looper is rotated sufficiently to place the thread within the hook of the needle. The needle then withdraws through the stock, carrying with it the thread which was placed there by the looper. During the looping of the thread and withdrawal of the needle the thread is positively delivered to the needle by the action of the tension-wheel and its actuating mechanism, hereinbefore described, and the entire amount of thread so delivered has been delivered before the needle reaches its extreme backward position. As soon as the desired amount of thread has been delivered the lever 57 is operated and withdraws the pawl 45 from engagement with the ratchet-wheel, by which means the tension-wheel is left under the control of its frictional means and the stitch is set by the backward movement of the needle, which causes the tension-wheel to rotate under the strain of the thread exerted by the needle. When the needle reaches its extreme backward position, the back gage is unlocked and slightly withdrawn from contact with the stock. The feed-point, which has previously been moved longitudinally through the channel and backward into the stock, and the channel-guide, which rests within the channel in the stock, then move longitudinally and feed the stock the desired distance between the stitches. As soon as the stock has been fed the back-gage moves forward and presses against the stock and is locked in such a position. During this lateral movement of the feed-point and channel-guide to feed the stock the needle moves slightly forward, thus slackening the loop of thread held in the hook of the needle, to compensate for the angular lead of the thread caused by the feeding of the work, thus preventing injury to the needle, breaking of the thread, or cutting or straining the between substance of the sole, or upon the disengagement of the feed-point with the material the pulling of the material backward a portion of the distance which it had previously been fed during the feed movement of the feed-point. The needle now continues its forward movement, enters the stock, and as it does so the feed-point withdraws. The needle continues its forward movement as the feed-point withdraws until the point of the needle is through the stock, when it holds the stock steady. The channel-guide withdraws from the stock, and the channel-guide and feed-point move longitudinally a distance equal to the amount of the feeding of the stock, then move into the channel, and are ready to feed the stock for the next stitch. The needle then moves forward the remainder of its forward movement and to the position shown in the drawings. During the feeding of the stock by the channel-guide and feed-point the return of the channel-guide and feed-point to position for the next stitch and the latter part of the forward movement of the needle the looper returns to the position shown on the drawings.

I am aware that it has been proposed in the prior art, as shown in the patent to Coupal, No. 385,299, illustrating a machine for drawing loops of thread through the upper and sole of turn-shoes and interlocking said loops with tongues of leather cut from the sole, to provide a tension-wheel and means in constant frictional engagement therewith for rotating the same to pay off thread to the needle. Such machines, however, are in no proper sense sewing-machines, since they do not form what can be properly called a "stitch," and I am the first to provide a sewing-machine with a tension of the nature hereinbefore described to coöperate with stitch-forming devices in the formation of a "stitch" properly so called, and the constructions herein illustrated are particularly adapted for such purpose in that the tension-wheel is positively and intermittently connected with its actuating mechanism as distinguished from being frictionally and continuously connected therewith. I am also aware that it has been proposed—for example, as in the patent to Prenzel, No. 589,949—to locate the feed-point in advance of the channel-guide—that is to say, on the side of the channel-guide opposite the needle before the feed takes place; but such channel-guide does not reciprocate across the plane of movements of the needle nor does the feed-point move into the plane of the needle, as a result of which the construction is incapable of securing the ease of turning the shoe while sewing around the toe and other advantages appurtenant to my construction, which are apparent to those skilled in the art.

Having thus fully described the nature, construction, and operation of my invention, I wish to secure by Letters Patent and claim—

1. A chain-stitch shoe-sewing machine, having, in combination, a hook-needle and a looper and means for actuating them, a tension-wheel, mechanism intermittently connected therewith and disconnected therefrom for positively rotating the said wheel to pay off thread, and frictional means controlling the rotation of said wheel when disconnected from said mechanism and during the latter part of the retracting stroke of the needle to permit its rotation when sufficient strain is brought upon the thread by the needle, substantially as described.

2. A chain-stitch shoe-sewing machine, having, in combination, a hook-needle and a looper and means for actuating them, a tension-wheel, mechanism positively connected therewith for rotating said wheel to pay off thread, means for disconnecting said wheel from said mechanism before the needle has completed its retracting stroke, and frictional means controlling the rotation of said wheel when disconnected from said mechanism to permit its rotation when sufficient strain is brought upon the thread by the needle, substantially as described.

3. A shoe-sewing machine, having, in combination, a tension, a looper, a feed-point, a hook-needle having a slight forward movement during the feed movement of the feed-point to prevent undue strain on the loop of thread held in the hook of the needle, and means for actuating the looper, feed-point and needle, substantially as described.

4. A shoe-sewing machine, having, in combination, a hook-needle, a looper, a tension, a channel-guide movable across the plane of movements of the needle, a feed-point located adjacent to the channel-guide and in advance of the same, and movable into the plane of motion of the needle, and means for actuating the needle, looper, channel-guide and feed-point, substantially as described.

5. A shoe-sewing machine, having, in combination, a hook-needle, a looper, a tension, a four-motion channel-guide movable toward and from the work and across the plane of movements of the needle, an independent four-motion feed-point located adjacent to the channel-guide and in advance of the same, the channel-guide and feed-point being movable in unison in the line of feed, and means for actuating the needle and looper, channel-guide and feed-point, substantially as described.

In testimony whereof I have signed my name to this specification in the presence of two subscribing witnesses.

ALFRED B. FOWLER.

Witnesses:
HENRY CHADBOURN,
VICTOR SANDAHL.